United States Patent [19]
Felburn

[11] 3,966,064
[45] June 29, 1976

[54] MULTI-PURPOSE VEHICLE

[76] Inventor: John Phil Felburn, 1700 Asheville Highway, P.O. Box 747, Hendersonville, N.C. 28739

[22] Filed: Sept. 16, 1974

[21] Appl. No.: 506,517

Related U.S. Application Data

[63] Continuation-in-part of Ser. No. 284,654, Aug. 29, 1972, abandoned.

[52] U.S. Cl. .......................... 214/131 R; 214/778; 214/DIG. 12
[51] Int. Cl.² ........................................... E02F 3/00
[58] Field of Search ......... 214/778, 731, 131, 86 A, 214/501, 771, 141, DIG. 12; 296/24 R

[56] References Cited
UNITED STATES PATENTS

| | | | |
|---|---|---|---|
| 2,606,674 | 8/1952 | Edwards | 214/501 |
| 3,027,033 | 3/1962 | Schuster | 214/731 |
| 3,063,576 | 11/1962 | Hofmeister | 214/731 |
| 3,207,338 | 9/1965 | Felburn | 214/131 |
| 3,261,485 | 7/1966 | Anderson | 214/141 |
| 3,567,056 | 3/1971 | Mason | 214/771 |

Primary Examiner—Robert J. Spar
Assistant Examiner—Ross Weaver
Attorney, Agent, or Firm—Michael Williams

[57] ABSTRACT

A multi-purpose vehicle which may be used for a variety of purposes, such for example, as a fork lift truck, a tow truck with a hoist, a tractor or truck for towing a four wheel vehicle, any of the foregoing in combination with each other or in combination with a load carrying bed or container, or a tractor for supporting and towing a semi-trailer, in combination with some of the foregoing.

My invention may be readily installed on a conventional roadway tractor and comprises a sub-frame including a pair of beams which have a horizontal component adapted to rest on top of the usual longitudinally extending beams of the main frame of the tractor in a normal horizontal position, and a vertical component adapted to be pivotally connected to a support some distance above the main frame. When the sub-frame is swung upwardly about the pivot, its rear end moves in a direction away from the rear of the tractor frame, whereby lifting and hoisting mechanism carried at the rear of the sub-frame clears the rear of the tractor frame.

The sub-frame, at its rear end, carries lift forks which are adjustable in a direction transversely of the sub-frame to accommodate loads of various sizes and widths. The sub-frame has side plates which cooperate with surfaces of the beams of the tractor frame to insure alignment of the sub-frame with the tractor frame. The side plates and the beams of the tractor frame have locking means to hold the sub-frame in its normal horizontal position and to relieve the sub-frame pivot of stresses applied through the fifth wheel. Additional locking means are carried by cross-members of the sub-frame and tractor beams for relief of transverse and longitudinal stresses.

10 Claims, 9 Drawing Figures

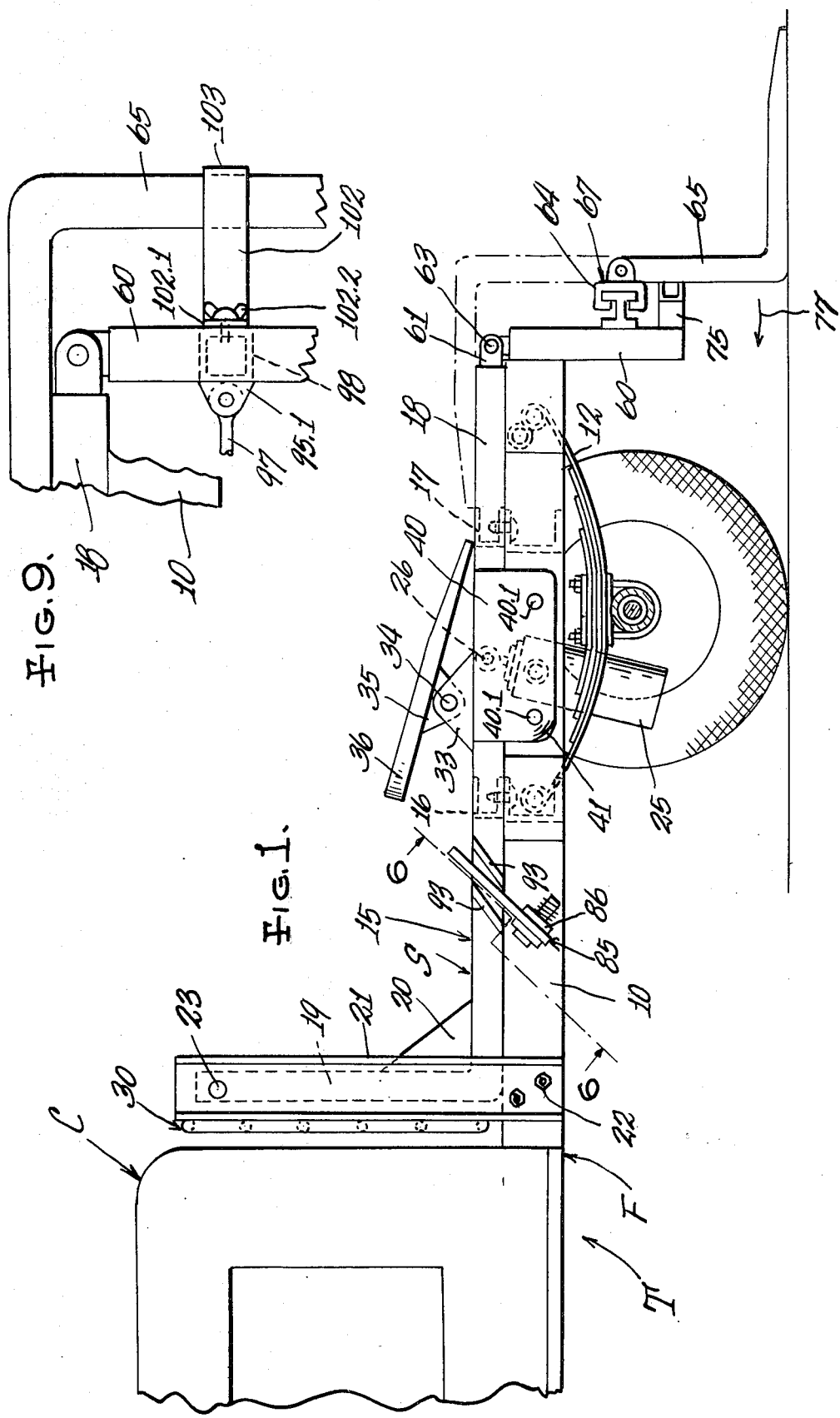

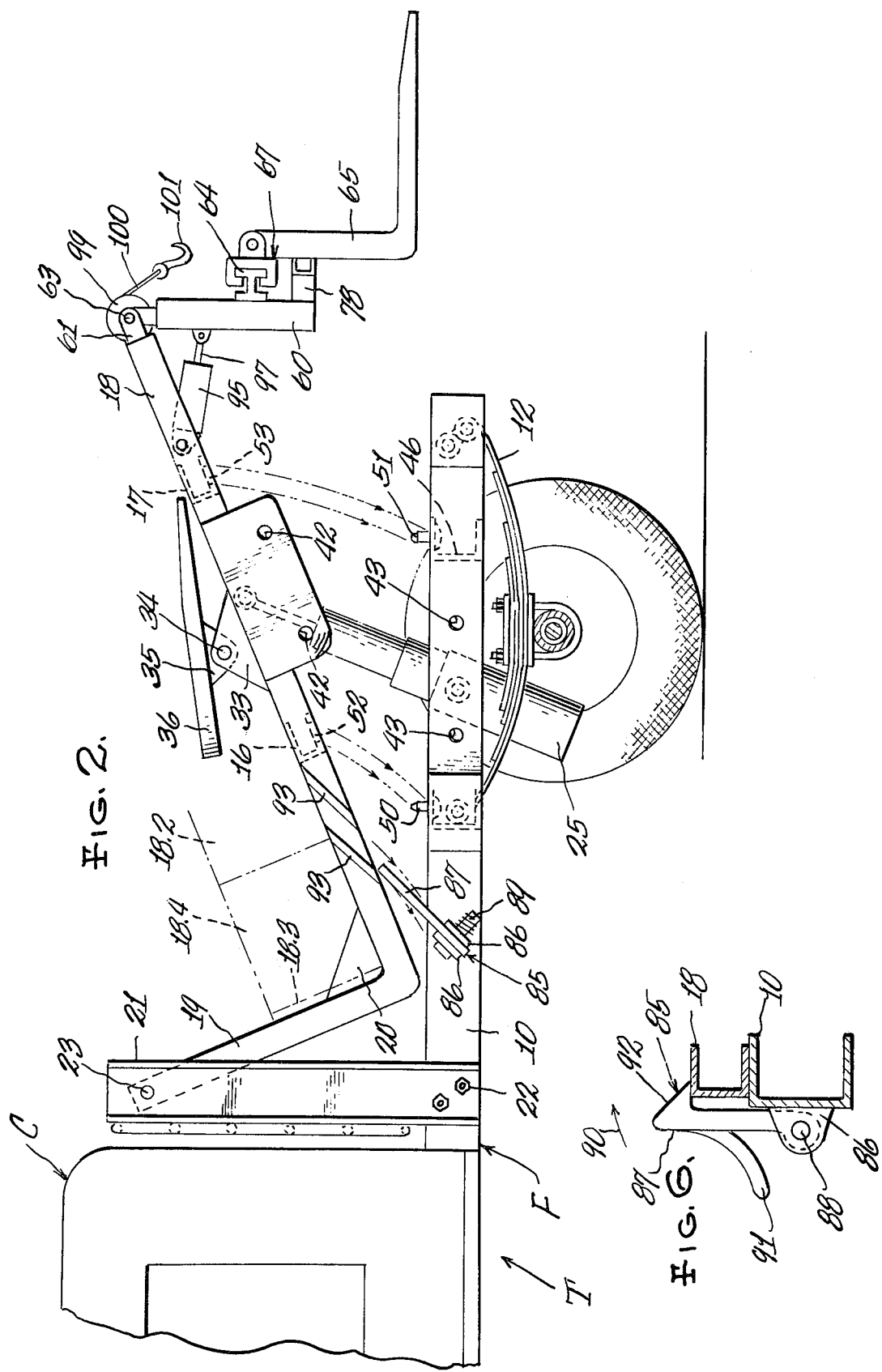

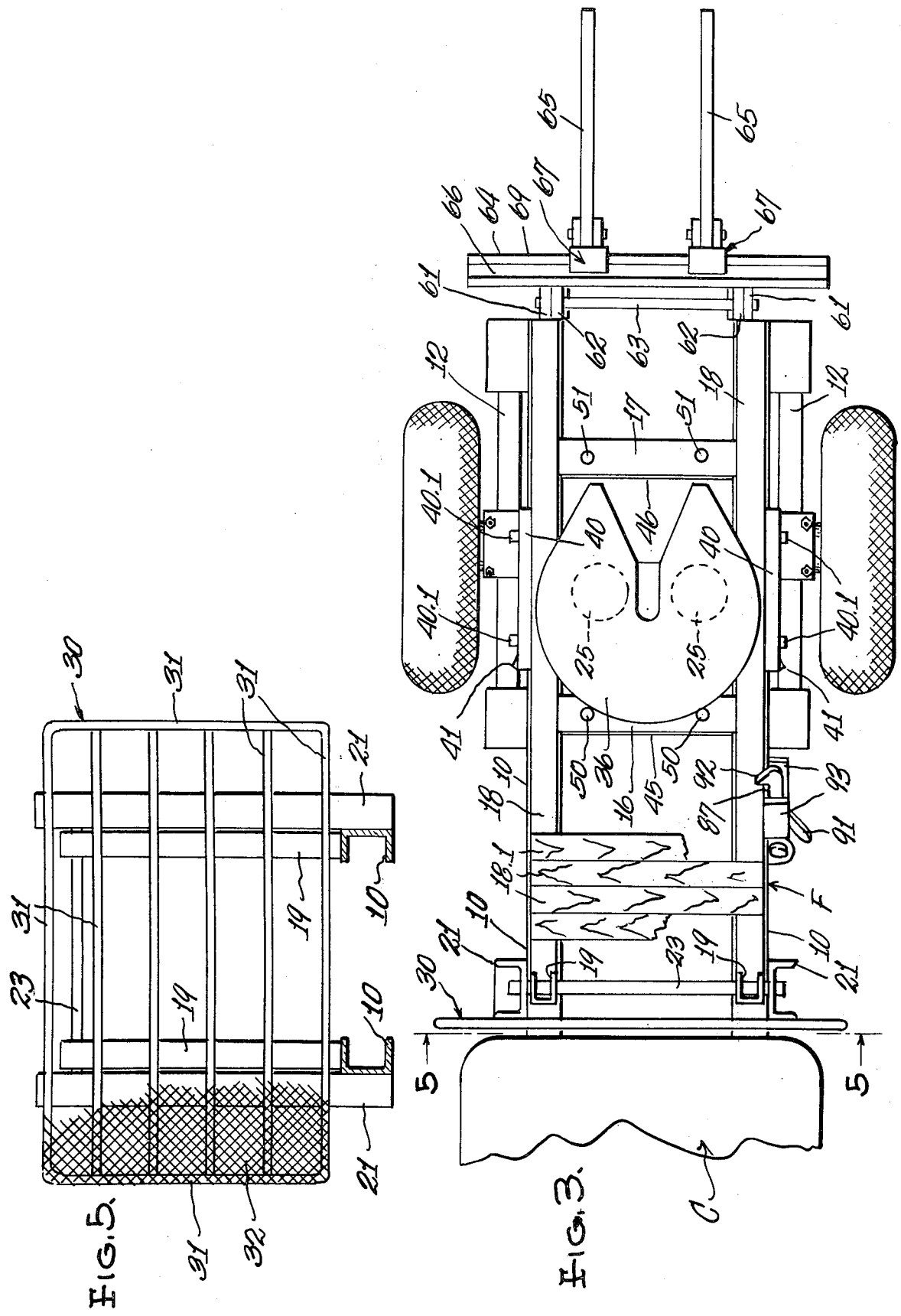

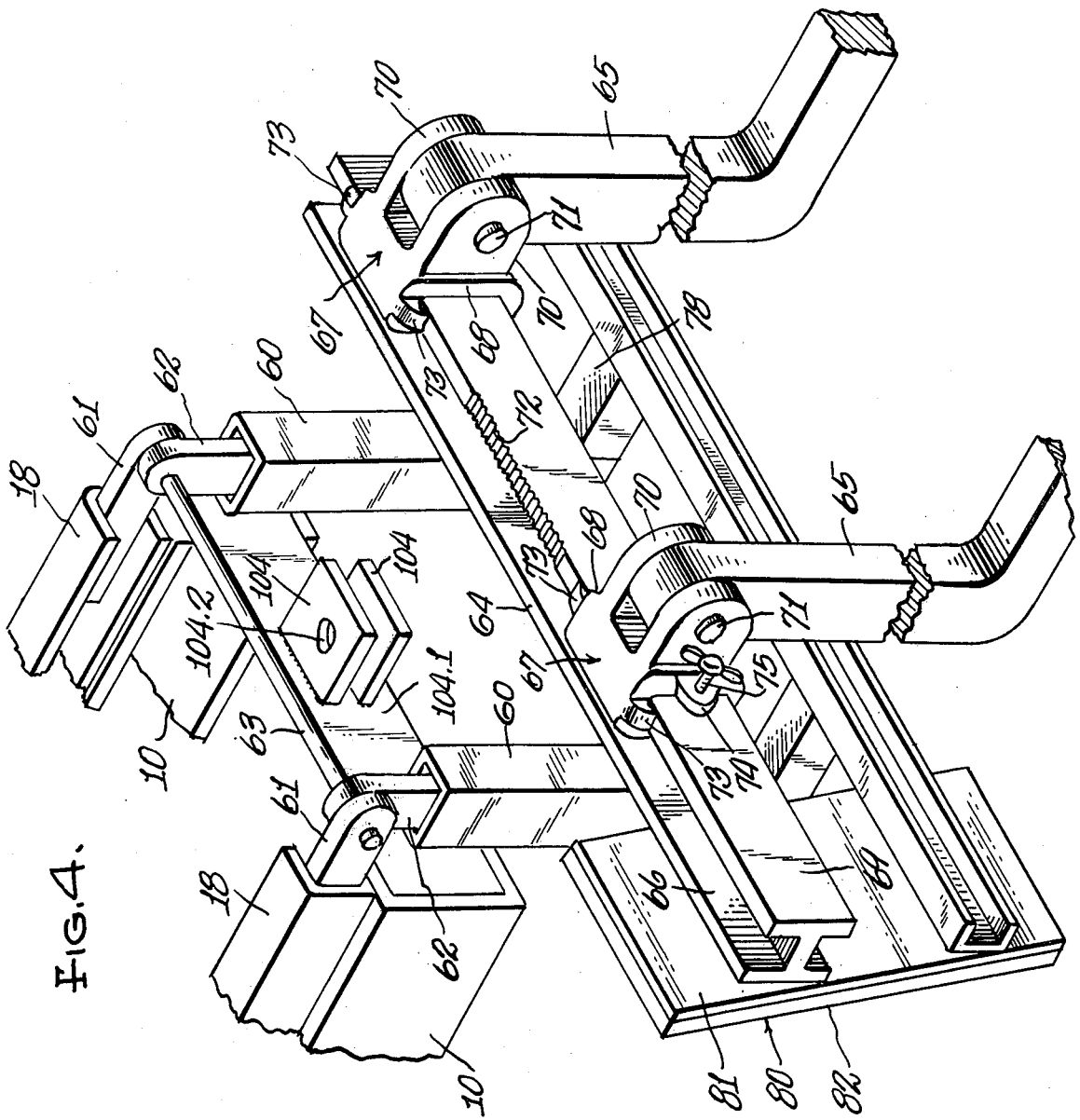

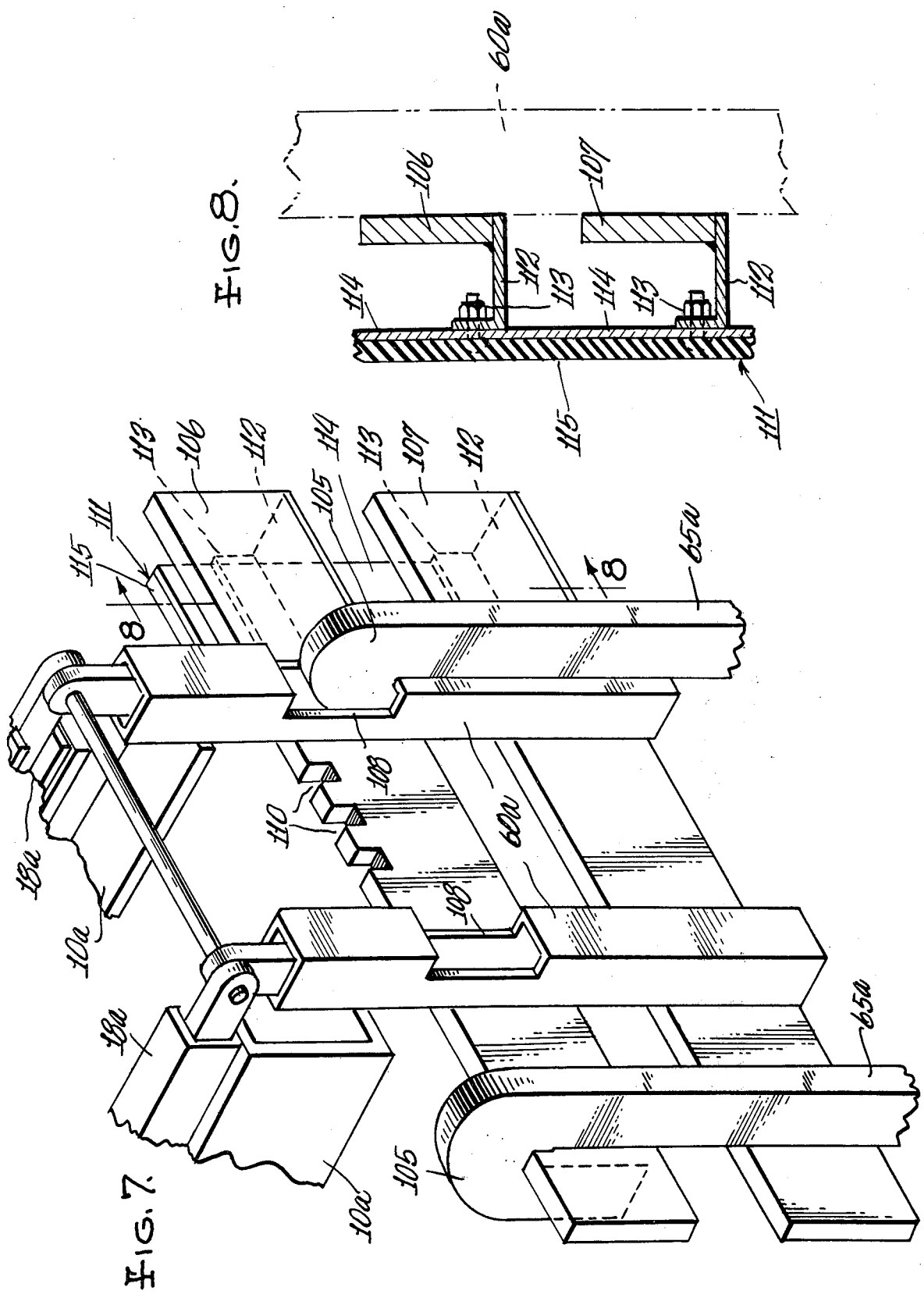

MULTI-PURPOSE VEHICLE

This application is a continuation-in-part of my previous application of the same title, filed Aug. 29, 1972, Ser. No. 284,654, now abandoned.

BACKGROUND AND SUMMARY

The present invention is an improvement over my prior U.S. Pat. Nos. 3,149,881 and 3,207,338, and provides a lift attachment for a roadway truck or tractor that is suitable for lifting loads or units of loads, either by means of lift forks or by a hoist, and in either case the load is supported clear of the rear of the tractor frame. This is accomplished by a pivot connection between the tractor frame and the sub-frame which causes the rear end of the latter to move in a direction away from the rear of the tractor as the subframe is elevated.

Lift forks are carried at the rear of the sub-frame for adjustment transversely thereof so that the lift forks may be spaced in accordance with the requirements of the load. Such lift forks also may be removably carried by the sub-frame in which case they may be stored on the tractor when not in use.

When the assembly is of the type for towing a conventional semi-trailer having a usual fifth wheel plate, the sub-frame is provided with a fifth wheel which is cooperable with the fifth wheel plate of the semi-trailer in normal manner. The assembly provides in a single vehicle features which heretofore were found only in a plurality of vehicles, and thus my invention reduces the amount of capital outlay on the part of the owner of the improved vehicle.

DESCRIPTION OF THE DRAWINGS

In the drawings accompanying this specification and forming a part of this application, there are shown, for purposes of illustration, several forms which my invention may assume, and in these drawings:

FIG. 1 is a broken, side elevational view of a roadway tractor, illustrating an embodiment of my invention, a wheel having been removed to better show the construction, FIG. 2 is a view similar to FIG. 1, with parts in partially elevated position, FIG. 3 is a broken top plan view of the construction seen in FIG. 1, FIG. 4 is an enlarged, fragmentary, perspective view of the rear portion of the construction shown in FIG. 1, FIG. 5 is a transverse sectional view corresponding to the line 5—5 of FIG. 3, FIG. 6 is an enlarged sectional view corresponding to the line 6—6 of FIG. 1, showing a latch mechanism, FIG. 7 is a perspective view similar to FIG. 4 but showing another embodiment of the invention, FIG. 8 is a fragmentary sectional view corresponding to the line 8—8 of FIG. 7, FIG. 9 is a fragmentary view of a detail, and FIG. 10 is a view somewhat similar to FIG. 2, showing further utility of my invention.

DESCRIPTION OF THE PREFERRED EMBODIMENT

With reference particularly to FIGS. 1 through 3, my invention is illustrated in combination with a roadway tractor T of any commercially available type, modified only by the attachment hereinafter to be described. The usual tractor has a frame F including a pair of longitudinally extending laterally spaced frame members 10, 10 which are usually formed of steel channels of sturdy size to support the heavy loads normally imposed upon the tractor. The tractor also has a cab C, and front wheels and a motor (not shown). At the rear of the tractor, rear wheels 11—11 are supported from the channels 10—10 by the usual springs 12—12 which have shackle connection with the channels, as shown.

A sub-frame S is supported by the tractor frame F so that the rear portion of the sub-frame may be elevated relative to the rear portion of the tractor. As herein disclosed, the sub-frame is formed as a welded fabrication of channels to provide two L-shaped arms 15 tied together by several cross beams, two of which, designated 16 and 17, being shown.

Each arm 15 has a longer, normally horizontally disposed channel 18 and a shorter, normally vertically disposed channel 19 welded to the channel 18 and the connection is braced by a gusset plate 20. The channels 18 are of lesser cross-sectional size as compared to the channels 10—10 and, as seen in FIG. 6, are adapted to rest on the top flange of the channels 10 in their normal horizontal position.

Upright channels 21—21 are disposed in close relation to the rear of the cab C, each having its lower end connected to the frame beams 10, such as by bolt and nut connections 22. The upper ends of the channels 21 are disposed a considerable distance above the tractor frame F, such as near the top of the cab C, and the upper ends of the sub-frame channels 19—19 are pivotally mounted on a cross rod 23 carried by the channels 21. Thus, the sub-frame S may swing about the pivot provided by the cross rod 23 and, as seen in FIG. 2, in so swinging, the rear portion of the sub-frame S moves in a direction rearwardly of the tractor frame.

To elevate the sub-frame S, a pair of fluid cylinders 25—25 are disposed between the tractor channels 10—10 and have trunnion connection therewith. Each cylinder includes a plurality of telescoping sections to effect maximum lifting distance and each has it rod end journalled on a cross bar 26 which extends crosswise of the sub-frame channels 18—18 and rigidly connected thereto to further brace the same. A fluid power unit, including valves and conduits, may be carried by the tractor to provide fluid under pressure, and control the same, to the cylinders 25. The power unit is not disclosed since it may be of any commercially available type and its construction and connections are well known to those skilled in the art.

In order to further utilize the upright channels 21—21, they may be provided with a barrier 30 to protect the occupants of the cab C from shifting loads on the truck tractor or a semi-trailer towed thereby. As best seen in FIG. 5, the carrier 30 comprises a plurality of upright and horizontal rods or tubes 31 rigidly connected together and to the channels 21, as by welding, to form what is termed a "headache rack". In addition to forming a barrier, the rods or tubes 31 reenforce the channels 21—21 to form a sturdy pivot structure for the sub-frame S. It is preferred to cover the members 31 with expanded metal 32 to guard against passage of small articles such as shifting tubes or bars which may constitute the load.

The sub-frame S is herein shown as adapted to tow a conventional semi-trailer (not shown) having a conventional upper fifth wheel plate and king pin, although in some instances, such as in lumber or other yards, and in factory work, the sub-frame need not be so adapted. As herein shown, ears 33 are connected to and extend upwardly from respective sub-frame channels 18 and a cross-shaft 34 extends through the ears and is connected thereto. The shaft pivotally supports ears 35 extending downwardly from a conventional fifth wheel 36.

With the sub-frame S in normal horizontal position, as seen in FIG. 1, the tractor T may be backed under the supported front end of a trailer in customary manner, to engage the fifth wheel 36 with the fifth wheel plate of the trailer. The elevating feature of the sub-frame is particularly advantageous at the time the trailer has been spotted and is ready for disconnection from the tractor. At this time, the sub-frame may be raised by the fluid cylinders so as to raise the front end of the trailer. The usual landing gear of the trailer may then be cranked down, with little effort, to engage it with the ground, and the tractor is then withdrawn. This operation requires less effort, and imposes less stress on the landing gear, then one that requires that the front end of the trailer be lifted by the landing gear.

Secured to the outwardly facing webs of the sub-frame channels 18, as by welding, are respective metal plates 40. These plates extend downwardly from the channels and slidably engage the outwardly facing webs of the tractor channels 10 so that in normal horizontal position the channels 10 are confined between the plates and therefore the sub-frame S is held aligned with the tractor frame. A lower forward end of each plate 40 may be outwardly curved, as shown at 41, to form a cam surface engageable with the frame channels 10 as the sub-frame S is lowered to horizontal position to assure centering of the sub-frame. Each plate has a pair of openings 42 which align with openings 43 in the webs of the frame channels 10 when the sub-frame is in horizontal position. Steel pins, 40.1 may be disposed in the aligned openings to perform two functions, one to prevent inadvertant elevation of the sub-frame and the other to lock the sub-frame to the main frame, and thus absorb forward and rearward thrust forces of the fifth wheel load and prevent such forces to be transmitted to the pivot of the sub-frame.

The tractor frame F has bracing cross channels 45 and 46 which are aligned with the sub-frame cross channels 16 and 17 when the sub-frame is in horizontal position. As best seen in FIGS. 2 and 3, a pair of pins 50—50 are fixed to and extend upwardly from the cross channel 45, and a similar pair of pins 51—51 extend upwardly from the cross-channel 46. The cross channels 16 and 17 of the sub-frame S are provided with pairs of holes 52 and 53 to receive respective pairs of pins 50, 51 when the sub-frame is in horizontal position to provide additional means for absorbing forward and rearward thrust forces of the fifth wheel load and prevent such forces to be transmitted to the pivot of the sub-frame. The holes 52 and 53 are slightly elongated and the pins are tapered at the top to compensate for the angular approach of the sub-frame to horizontal position.

A fork lift arrangement is carried at the rear of the sub-frame 15 and, as best seen in FIG. 4, a pair of depending members 60, 60 are pivoted to respective channels 18. The members 60 are preferably of tubular cross-section and may be metal tubes of the rectangular cross-section as shown. The upper ends of the members may be pivoted to the rear ends of channels in any suitable manner. In the disclosed embodiment, a bar 61 is welded within each channel 18 and a complementary bar 62 is welded within each metal tube 60, respective bars 61, 62 being joined by a pivot-forming cross rod 63.

A metal cross member 64 is rigidly connected, as by welding, across intermediate portions of the tubes 60 to support fork lifts 65 for adjustment transversely of the longitudinal axis of the tractor. As seen in FIG. 4, the cross member 64 is preferably of I section, with its rear flange welded to the tubes 60 so as to dispose the longitudinal grooves 66 vertically. Brackets 67 are provided to connect the upper end of respective fork lifts 65 to the cross member 64 and in the disclosed embodiment, each bracket has a C-shaped body 68 fitting around the flat flange 69 of the cross member 64. Each bracket 67 has a pair of ears 70 between which the upper end of a respective lift fork 65 is pivoted by means of pivot rods 71.

Each C-shaped body has a sliding fit with the front flange 69 so that the lift forks may be adjusted along the cross-member 64 to provide the correct spacing therebetween to accommodate a specific load. The brackets 67 may be assembled with, or disassembled from, the cross member 64 from either end of the latter. When not in use, the lift forks may be swung about the pivot rods 71 to an out-of-the-way position shown in dot-dash lines in FIG. 1. The upper surface of the front flange 69 may be serrated, as partially shown at 72, and each bracket may have oppositely disposed fingers 73 which fit into selected valleys of the serrations, to prevent the brackets 67 from unintentionally sliding along the cross member 67. If desired, each bracket may also have an ear 74 to receive the threaded shank of a locking bolt 75, to firmly hold each bracket in position.

Since the fork lifts 65 are pivotally carried by the cross member, an abutment member 76, here shown as a metal channel, is provided to prevent the fork lifts from swinging from operative position in the direction of the arrow 77 seen in FIG. 1. The channel 76 may be welded to one end of short metal tubes 78, the opposite end of each tube being welded to the lower end of a respective upright metal tube 60.

The construction disclosed is ideally suited for the mounting of mud flaps 80, one being shown in FIG. 4. As shown, a metal plate 81 may be welded to the cross member 64 and the cross channel 76, or alternatively brackets, not shown, may be used to connect the metal plate to these parts. A pad 82, formed of rubber, canvas, or the like, is secured in position overlying the plate. Each mud flap 80 is to the rear, and aligned with a rear tire of the tractor when the sub-frame 15 is in normal horizontal position.

In order to hold the sub-frame 15 to the main frame F, a latch means 85 is provided to automatically engage when the sub-frame is lowered to its normal horizontal position. FIGS. 3 and 6 illustrate a single latch which, if desired, may be duplicated on the other side of the frame. In one form of latch, a pair of ears 86 are welded to the outside surface of the web of a frame channel 10 and a latch dog 87 is pivoted to the ears by means of a rod 88 having a head at one end and a torsion spring 89 mounted on the other. The pivot rod 88 is fixed to rotate with the latch dog and the coil spring has one end fixed to the pivot rod 88 and the other end fixed to the adjoining ear 86, the spring acting to urge the latch dog 87 in the direction of the arrow 90 shown in FIG. 6. A manually operable handle 91 extends from the latch dog so that an operator may move the latter to release the same so that the sub-frame 15 may be elevated. The latch dog has a cam surface 92 which is engaged by the channel 18 of the sub-frame when the latter nears horizontal position to swing the dog in the direction opposite to the arrow 90 until the sub-frame channel 18 rests on the main channel 10, whereupon the spring will urge the latch dog to engage over the channel 18.

The latch means 85 is shown disposed at an angle to the vertical and spaced lugs 93 are welded to the sub-frame channel 18 at a complementary angle. As seen by the dot-dash lines in FIG. 2, the lugs 93 will be moved to straddle the latch dog when the sub-frame S rests on the main frame F to absorb forward and rearward thrust forces of the fifth wheel load.

As shown in my patent 3,207,338, a fluid cylinder 95 (shown only in FIG. 2) may have its blank end pivotally connected to a rod 96, extending crosswise of the sub-frame channels 18. The piston rod 97 of the cylinder is pivotally connected to ears 95.1 (see especially FIG. 9) extending from the midpoint of a tube 98 which is welded to and disposed crosswise of the vertical tubes 60, 60. A manually controlled valve, as shown in said patent, may be controlled by the operator to extend the piston rod 97 and thereby maintain the tines of the fork lift in substantially horizontal position as the sub-frame is elevated through its arcuate path to various elevations.

Also, as shown in my patent 3,207,338, a sheave 99 (shown only in FIG. 2) may be rotatably mounted on cross rod 63. A flexible cable 100 is trained over the sheave 99 and has a hoisting hook 101 at its free end. The other end of the cable may be wound on a cable storage drum (not shown but similar to that shown in my said patent) and a crank may be provided to rotate the drum.

In order to hold the fork lifts in the position shown in dotted lines in FIG. 1 and full lines in FIG. 9, and to reduce rattling thereof, a pair of steel straps 102, each of Z formation, may have one end 102.1 connected to the cross tube 98 by means of a wing bolt 102.2 and its other end 103 engaged over the vertical portion of the fork lifts 65. It will be appreciated that at this time, the fork lifts have been adjusted along the cross member 64 so that they are aligned with respective channels 18 of the sub-frame 15.

As seen only in FIG. 4, a pair of spaced horizontally disposed metal brackets 104 may be welded to a metal plate 104.1 which in turn is welded crosswise of the rear ends of the main frame channels 10, 10. The brackets 104 are formed with vertically aligned openings 104.2 which are adapted to receive a pintle pin (not shown) for connecting the forward end of a draft link (also not shown). Thus, the tractor T is adapted to tow a conventional four wheel vehicle.

As seen only in FIG. 3, planks 18.1 may be secured crosswise of and to the upper surfaces of the sub-frame channels 18, 18, to form a flat bed to support a load. In this case, the sub-frame is preferably not provided with a fifth wheel 36 so that the bed may be extended to the rear end of the sub-frame. To increase utility of the vehicle, the ears 33 which support the fifth wheel may be removably connected to the sub-frame channels 18, 18 so that the fifth wheel may be installed, when and if desired.

To further increase utility of the vehicle, the bed may be provided with opposite sides (as shown by dot-dash lines 18.2 in FIG. 2) and the bulkhead 18.3. A door 18.4 may be provided in the forward end of one or both sides 18.2 so that loose material, such as construction aggregates, may be removed from the container formed by the bed 18.1, the sides 18.2 and the bulkhead 18.3. This adaptation of my invention is ideally suited for use by contractors engaged in construction work located a considerable distance from the storage yard. The contractor may load loose aggregates in the container on the sub-frame S and may load palletized material, such as bricks, siding or dry wall board on a four wheel vehicle towed by the tractor. At the building site, the aggregates may be removed from the container carried by the sub-frame S and the lift forks 65 may be used to remove the palletized material from the four wheel vehicle. The hoist hook 101 may be used to move heavy material or to erect or transport building beams, or to remove beams and the like from the four wheel vehicle.

DESCRIPTION OF OTHER EMBODIMENT

In FIGS. 7 and 8, a slightly different support for the fork lifts 65a is shown, and the fork lifts are modified to provide a hook 105 at the upper end thereof. A pair of steel plates 106, 107 are welded to, and extend crosswise of, the metal tubes 60a, and the latter, as before, are pivoted to the ends of the channels 18a of the sub-frame 15a. Each metal tube 60a has an opening 108 formed by cutting away walls of the tube.

In this embodiment, the fork lifts 65a are detachable and when not in use may be stored in the tractor cab or any suitable carrying place on the tractor. The hooks 105 of the fork lifts may be engaged over the upper edge portion of the plate 106 at any related position therealong, the upright portion of the fork lift bearing against the plate 107 to prevent such upright portion from swinging in a direction toward the forward part of the tractor.

Any suitable means may be provided to prevent the hooks 105 from moving longitudinally along the plate 106, such as the serrations 72 shown in FIG. 4. As seen in FIG. 7, cross slots 110 may be formed in the upper edge portion of the plate 106, each slot being adapted to receive the width of a hook. The hooks 105 may also be seated within an opening 108 in a metal tube 65a so that full adjustment of the fork lifts crosswise of the rear of the sub-frame 15a is provided.

The construction illustrated in FIGS. 7 and 8 is also ideally suited to provide mud flaps 111 rearwardly of and in alignment with each rear wheel of the tractor. In this embodiment, brackets 112 are welded to the lower edge of each plate 106, 107, each bracket having an angular leg 113 to which may be bolted a metal backing plate 114 for the rubber or canvas flap 115.

FIG. 10 illustrates a manner in which my improved construction may be used to secure additional elevation for the fork lift arrangement and similar reference numerals will be used to designate similar parts. In FIG. 10, the fork lift support of FIGS. 7 and 8 is illustrated, with the support shown in two vertical positions, a lower one shown in dot-dash lines, and an upper one shown in full limes.

The metal tubes 60a, as in FIGS. 7 and 8, are pivotally connected to the rear ends of the channels 18a of sub-frame 10a by a cross-shaft. The steel plates 106, 107 are welded crosswise of the tubes 60a to maintain lateral alignment and effect unitary movement. Matching pairs of ears 125, 126 are welded to the front and rear surfaces of respective tubes 60a. A cross-shaft 127 is adapted to be disposed through aligned holes in either of the paired ears 125, 125 or 126, 126.

A fluid cylinder 128 has its blank end pivotally carried by a shaft which extends crosswise of the channels 18a and preferably this cylinder is of the telescoping type to provide for maximum rod extension. The end of the cylinder rod 129 is pivotally connected to the cross-shaft 127.

As seen in dot-dash lines in FIG. 10, the fork lift support is in its lower position wherein the tubes 60a extend vertically downwardly from their pivot with the rear ends of the channels 18a. The cross-shaft 127 is seated within aligned holes in the ears 125, which now face rearwardly, and the rod end of the cylinder 128 is connected to the cross-shaft. By control of fluid to the cylinder, the tubes 60a may be held vertical, or at any other desired angularity. In this case the hooks 105 of the fork lift 65a engage over plate 107, which now is lowermost.

The fork lift support may be shifted to its upper position shown in full lines in FIG. 10 with a minimum of effort. First of all, the fork lifts 65a are preferably removed from their support. Then, the cross-shaft 127 is withdrawn from the ears 125 and the tubes 60a are swung in a counter clockwise direction about their pivots with the channels 18a to the upstanding vertical position. The cross-shaft 127 is disposed through aligned holes in the ears 126 which now face rearwardly, with the end of the rod 129 connected to the shaft. The fork lifts 65a are then hooked over the cross plate 127.

In some cases it is desirable that the rear end of the sub-frame be shifted an even greater distance beyond the rear end of the tractor, and FIG. 10 shows one way this may be easily accomplished. Instead of rigidly connecting the horizontal and vertical components 18 and 19 of each sub-frame arm 15, these components may be pivoted together as shown at 130, so that the angle between them may be varied from the right angled relationship to an obtuse angle, for example, whereby the rear end of the sub-frame is projected a greater amount beyond the rear of the tractor.

An extensible-retractible brace is pivotally connected between the legs 18 and 19 to hold the same in a fixed angular relationship. In FIG. 10, a fluid cylinder 131 is provided for this purpose since by regulation of the fluid supplied to the cylinder, the angle between the legs 18 and 19 may be easily changed.

I claim:

1. A roadway tractor for towing a semi-trailer having the usual fifth wheel plate, said tractor including a horizontal frame and wheels connected to and supporting the frame from a roadway, the improvement comprising:
    upright support means having its lower end connected to a forward part of said frame and its upper end disposed a considerable distance above said frame,
    a sub-frame having a first portion carrying a fifth wheel for engagement with said fifth wheel plate, said first portion being normally horizontal in juxtaposition to said frame,
    said sub-frame also having an upright second portion rigidly connected to said first portion with its upper end pivoted to the upper end of said support means,
    whereby said sub-frame may be swung about the pivot to elevate its normally horizontal first portion and in so doing causing the rear part of said first portion and said fifth wheel to move in a direction rearwardly of said frame,
    means for effecting pivotal movement of said sub-frame,
    said frame including a pair of laterally spaced longitudinally extending beams,
    said sub-frame first portion including a pair of beams longitudinally aligned with said frame beams and resting thereon in normally horizontal position,
    and metal side plate secured to each beam of said sub-frame first portion and depending therefrom, each plate cooperating with a side portion of a respective frame beam to maintain longitudinal alignment of said frame and sub-frame in horizontal position.

2. The construction according to claim 1 wherein said side plate has at least one opening aligned with an opening in said frame when said sub-frame first portion is in horizontal position,
    and pins closely passing through said aligned openings for holding said sub-frame first portion in horizontal position and for relieving the sub-frame pivot of longitudinal stresses applied to the sub-frame through said fifth wheel.

3. The construction according to claim 1 wherein the rear end of each sub-frame beam has a metal member pivotally connected thereto,
    a cross bar rigidly connected across said metal member,
    and fork lift means carried by said cross bar and disposed at selected positions therealong for adjustment transverse of the longitudinal axis of eaid tractor.

4. A roadway tractor for towing a semi-trailer having the usual fifth wheel plate, said tractor including a horizontal frame and wheels connected to and supporting the frame from a roadway, the improvement comprising:
    upright support means having its lower end connected to a forward part of said frame and its upper end disposed a considerable distance above said frame,
    a sub-frame having a first portion carrying a fifth wheel for engagement with said fifth wheel plate, said first portion being normally horizontal in juxtaposition to said frame,
    said sub-frame also having an upright second portion rigidly connected to said first portion with its upper end pivoted to the upper end of said support means,
    whereby said sub-frame may be swung about the pivot to elevate its normally horizontal first portion and in so doing causing the rear part of said first portion and said fifth wheel to move in a direction rearwardly of said frame,
    means for effecting pivotal movement of said sub-frame,
    said frame including a pair of laterally spaced longitudinally extending beams,
    said sub-frame first portion including a pair of beams longitudinally aligned with said frame beams and resting thereon in normally horizontal position, and,
    cross beams rigidly secured between the beams of said frame and said sub-frame respectively, wherein one of said cross beams has an upright pin and the other is provided with an opening to closely receive said pin when said sub-frame is in normal horizontal position to relieve the sub-frame pivot of longitudinal stresses applied to the sub-frame through said fifth wheel.

5. A roadway tractor for towing a semi-trailer having the usual fifth wheel plate, said tractor including a horizontal frame and wheels connected to and supporting the frame from a roadway, the improvement comprising:

upright support means having its lower end connected to a forward part of said frame and its upper end disposed a considerable distance above said frame, a sub-frame having a first portion carrying a fifth wheel for engagement with said fifth wheel plate, said first portion being normally horizontal in juxtaposition to said frame, said sub-frame also having an upright second position rigidly connected to said first portion with its upper end pivoted to the upper end of said support means, whereby said sub-frame may be swung about the pivot to elevate its normally horizontal first portion and in so doing causing the rear part of said first portion and said fifth wheel to move in a direction rearwardly of said frame, means for effecting pivotal movement of said sub-frame, said frame including a pair of laterally spaced longitudinally extending beams, said sub-frame first portion including a pair of beams longitudinally aligned with said frame beams and resting thereon in normally horizontal position, a latch body carried by a frame beam having a hook pivotally connected thereto adapted to lock over a top surface of a beam of said sub-frame to hold the latter in horizontal position, said hook being spring-pressed to locking position and having a manually operative handle for withdrawing it from locking position, and, said hook also having a cam surface cooperable with a sub-frame beam when the latter is moved from elevated to horizontal position to move said hook away from locking position until said sub-frame rests on said frame beam whereupon the spring moves said hook to locking position.

6. A roadway tractor for towing a semi-trailer, comprising:

a main frame including a main pair of laterally spaced horizontally disposed steel beams extending longitudinally of said tractor, wheels connected to said frame for supporting it from a roadway, and an operator's cab fixed to the forward end of said frame, a pair of upright steel beams, each having its lower end rigidly fixed to a respective one of said main beams at a position behind said cab, and each having its upper end terminating near the upper end of said cab, a sub-frame comprising a pair of secondary steel beams, each of L-shape to provide a long first portion disposed normally horizontal and in juxtaposition to a respective main beam, and a shorter second portion extending upwardly from an end of a respective first portion with its upper end pivotally connected to the upper end of a respective upright steel beam, the pivots being in axial alignment, cross members fixed betwen said secondary steel beams to maintain the same in lateral alignment and to hold them to unitary movement, said sub-frame being free of any connection with said main frame at the latter's rear end, whereby said sub-frame may be swung about said pivots to elevate the normal horizontal first portions of said secondary beams and in so doing causing the rear part of said first portions to move in a direction rearwardly of said frame, support means disposed at the rear end of said sub-frame, comprising a pair of metal support members each having an end pivoted to the rear end of a respective first portion so that the opposite end may be swung about such pivot, cross-members fixed between said support members to maintain the same in lateral alignment and to hold them to unitary movement, and a fluid cylinder connected between a metal support member and a corresponding first portion at places spaced from their pivotal connection, said fluid cylinder being adapted to selectively hold said metal support members in a position extending downwardly from said first portion, and in a position extending upwardly from said first portion.

7. The construction according to claim 6, wherein a fork lift member is adapted for connection with a cross-member of said support means in either position of said metal support member, said fork lift member having a hook at its upper end which is engaged over said cross-member.

8. A roadway tractor for towing a semi-trailer, comprising:

a main frame including a main pair of laterally spaced horizontally disposed steel beams extending longitudinally of said tractor, wheels connected to said frame for supporting it from a roadway, and an operator's cab fixed to the forward end of said frame, a pair of upright steel beams, each having its lower end rigidly fixed to a respective one of said main beams at a position behind said cab, and each having its upper end terminating near the upper end of said cab, a sub-frame comprising a pair of secondary steel beams, each of L-shape to provide a long first portion disposed normally horizontal and in juxtaposition to a respective main beam, and a shorter second portion extending upwardly from an end of a respective first portion with its upper end pivotally connected to the upper end of a respective upright steel beam, the pivots being in axial alignment, said first and second portions of each L-shaped secondary steel beam being pivoted together, whereby the angle included therebetween may be varied, cross members fixed between said secondary steel beams to maintain the same in lateral alignment and to hold them to unitary movement, said sub-frame being free of any connection with said main frame at the latter's rear end, whereby said sub-frame may be swung about said pivots to elevate the normal horizontal first portions of said secondary beams and in so doing causing the rear part of said first portions to move in a direction rearwardly of said frame.

9. The construction according to claim 8 wherein an extensible-contractible link has opposite ends respectively connected to said first and second portions at places spaced from their pivot, to hold said first and second portions in selected angular relationship.

10. The construction according to claim 9 wherein said link is a fluid cylinder.

* * * * *